(12) United States Patent
Chen et al.

(10) Patent No.: US 9,506,761 B2
(45) Date of Patent: Nov. 29, 2016

(54) METHOD AND APPARATUS FOR INDOOR POSITION TAGGING

(71) Applicant: Alcatel-Lucent USA Inc., Murray Hill, NJ (US)

(72) Inventors: Byron Chen, Whippany, NJ (US); Amy Ortega, Succasunna, NJ (US); Tin Ho, Millburn, NJ (US); Piotr Mirowski, New York, NY (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/152,437

(22) Filed: Jan. 10, 2014

(65) Prior Publication Data

US 2015/0198447 A1    Jul. 16, 2015

(51) Int. Cl.
G01C 21/16 (2006.01)
G01C 21/20 (2006.01)
H04W 16/20 (2009.01)

(52) U.S. Cl.
CPC ............. *G01C 21/16* (2013.01); *G01C 21/206* (2013.01); *H04W 16/20* (2013.01)

(58) Field of Classification Search
CPC ....... G01C 21/14; G01C 21/12; G01C 21/16
See application file for complete search history.

(56) References Cited

U.S. PATENT DOCUMENTS

| | | | |
|---|---|---|---|
| 8,438,373 B2 | 5/2013 | Rubin et al. | |
| 8,498,811 B2 | 7/2013 | Lundquist et al. | |
| 8,548,738 B1 | 10/2013 | Kadous et al. | |
| 2006/0284979 A1 | 12/2006 | Clarkson | |
| 2008/0274728 A1 | 11/2008 | Anderson et al. | |
| 2009/0043504 A1 | 2/2009 | Bandyopadhyay et al. | |
| 2011/0250904 A1 | 10/2011 | Valletta et al. | |
| 2011/0275364 A1* | 11/2011 | Austin et al. | 455/423 |
| 2012/0100867 A1 | 4/2012 | Liang et al. | |
| 2012/0214515 A1* | 8/2012 | Davis | H04W 4/023 455/456.3 |
| 2012/0218444 A1 | 8/2012 | Stach | |
| 2012/0239333 A1 | 9/2012 | Keene et al. | |
| 2012/0290254 A1 | 11/2012 | Thrun et al. | |
| 2012/0315918 A1 | 12/2012 | Kadous | |
| 2013/0045751 A1 | 2/2013 | Chao et al. | |
| 2013/0053056 A1 | 2/2013 | Aggarwal et al. | |

(Continued)

FOREIGN PATENT DOCUMENTS

WO    2013/024278 A1    2/2013
WO    2013/065042 A1    5/2013

(Continued)

*Primary Examiner* — Michael D Lang
(74) *Attorney, Agent, or Firm* — McCormick, Paulding & Huber, LLP

(57) ABSTRACT

A system and method for position tagging within an environment includes at least one mobile electronic device adapted to be moved within the environment and a pedestrian dead reckoning module. The at least one mobile electronic device includes an inertial measurement unit and at least one of a near field communication chip, barcode scanner, global positioning system, Bluetooth receiver or WiFi receiver. The pedestrian dead reckoning module is adapted to query and record time stamped readings from the inertial measurement unit and the at least one of the near field communication chip, barcode scanner, global positioning system, Bluetooth receiver or WiFi receiver. The system and method may generate one or more spatial maps of the environment through the collection of radio frequency signal data along with the time stamped readings.

12 Claims, 4 Drawing Sheets

(56) References Cited

U.S. PATENT DOCUMENTS

| | | |
|---|---|---|
| 2013/0113993 A1 | 5/2013 | Dagit, III |
| 2013/0131973 A1 | 5/2013 | Friedler et al. |
| 2013/0151343 A1 | 6/2013 | Phan |
| 2013/0158941 A1 | 6/2013 | Yang et al. |
| 2013/0179110 A1 | 7/2013 | Lee |
| 2013/0226451 A1 | 8/2013 | O'Neill et al. |
| 2013/0247117 A1* | 9/2013 | Yamada et al. ................. 725/93 |
| 2013/0261964 A1* | 10/2013 | Goldman et al. ............. 701/500 |

FOREIGN PATENT DOCUMENTS

| | | |
|---|---|---|
| WO | 2013065042 A1 | 5/2013 |
| WO | 2013/108243 A1 | 7/2013 |
| WO | 2013/134724 A1 | 9/2013 |

* cited by examiner

METHOD AND APPARATUS FOR INDOOR POSITION TAGGING

FIELD OF THE INVENTION

The present invention relates to localization and mapping.

BACKGROUND OF THE INVENTION

Global positioning systems (GPS) do not typically provide reliable coverage of indoor environments due to GPS signal penetration loss, often estimated to be 20 dB. Without reliable GPS coverage, GPS end user coordinate information is typically not available in the indoor environments, making it difficult to efficiently deploy network small cells and analyze network performance because the location of User Equipment (UE) within the indoor environment cannot be reliably pinpointed. Consequently, indoor network small cells are often placed in a subjective manner by equal spatial distribution and performance optimization of indoor network small cells is manual labor intensive.

SUMMARY

According to an embodiment, a system for providing position tagging during the deployment and/or optimization of indoor network small cells within an environment includes at least one mobile electronic device adapted to be moved within the environment and a pedestrian dead reckoning module. The at least one mobile electronic device includes an inertial measurement unit and at least one of a near field communication chip, barcode scanner, global positioning system, Bluetooth receiver or WiFi receiver. The pedestrian dead reckoning module is adapted to query and record time stamped readings from the inertial measurement unit and at least one of the near field communication chip, barcode scanner, global positioning system, Bluetooth receiver or WiFi receiver.

According to an embodiment, the pedestrian dead reckoning module is adapted to translate the recorded readings into geographic coordinates for respective steps of a user carrying the mobile electronic device.

According to an embodiment, the at least one of the near field communication chip, barcode scanner, global positioning system, Bluetooth receiver or WiFi receiver is adapted to provide the pedestrian dead reckoning module with a reference position for the mobile electronic device.

According to an embodiment, the system additionally includes a refinement module adapted to post-process the geographic coordinates using at least one signal from a radio frequency receiver of the mobile electronic device.

According to an embodiment, the pedestrian dead reckoning module resides on the mobile electronic device and the refinement module resides on a server remote from the mobile electronic device.

According to an embodiment, the system includes a graphical user interface adapted to be displayed on a screen of the mobile electronic device.

According to an embodiment, a computerized method includes recording, through a pedestrian dead reckoning module executed by a processor of a mobile device, time stamped readings from an inertial measurement unit of the mobile device, and translating the recorded readings into geographic coordinates for respective steps of a user carrying the mobile device.

According to an embodiment, the computerized method also includes recording, through the pedestrian dead reckoning module, absolute position data input through at least one of a near field communication chip, barcode scanner, global positioning system, Bluetooth receiver or WiFi receiver of the mobile device, and setting, in the pedestrian dead reckoning module, a reference position for the mobile device to the recorded absolute position data.

According to an embodiment, the computerized method also includes calibrating, in the pedestrian dead reckoning module, a length of stride and a pocket offset angle for the mobile device.

According to an embodiment, the computerized method also includes recording, through the pedestrian dead reckoning module executed by the processor of the mobile device, at least one time stamped signal from a radio frequency receiver of the mobile electronic device.

According to an embodiment, the computerized method also includes smoothing, by a refinement module on a server, the geographic coordinates using the at least one signal from the radio frequency receiver of the mobile electronic device.

According to an embodiment, the computerized method additionally includes generating, by the refinement module on the server, a map of network coverage with the refined geographic coordinates.

According to an embodiment, the map includes at least one of a data heat map or radio frequency coverage map.

According to an embodiment, the map includes at least one performance metric showing at least one of handoff failures, dropped calls or data throughput variation along a trajectory defined by the geographic coordinates.

According to an embodiment, a non-transitory, tangible computer-readable medium storing instructions adapted to be executed by at least one processor to perform a method may comprise the steps of recording, through a pedestrian dead reckoning module executed by a processor of a mobile device, time stamped readings from an inertial measurement unit of the mobile device, and translating, through the pedestrian dead reckoning module, the recorded readings into geographic coordinates for each step of a user carrying the mobile device.

According to an embodiment, the method may also include recording, through the pedestrian dead reckoning module, absolute position data input through at least one of a near field communication chip, barcode scanner, global positioning system, Bluetooth receiver or WiFi receiver of the mobile device, and setting, in the pedestrian dead reckoning module, a reference position for the mobile device to the recorded absolute position data.

According to an embodiment, the method may also include calibrating, in the pedestrian dead reckoning module, a length of stride and a pocket offset angle for the mobile device.

According to an embodiment, the method may also include recording, through the pedestrian dead reckoning module executed by the processor of the mobile device, at least one time stamped signal from a radio frequency receiver of the mobile electronic device.

According to an embodiment, the method may additionally include smoothing, by a refinement module on a server, the geographic coordinates using the at least one signal from the radio frequency receiver of the mobile electronic device.

According to an embodiment, the method may additionally include generating, by the refinement module on the server, a map of network coverage with the refined geographic coordinates, the map including at least one of a data heat map, a radio frequency coverage map or at least one performance metric showing at least one of handoff failures, dropped calls or data throughput variation along a trajectory defined by the geographic coordinates.

These and other embodiments will become apparent in light of the following detailed description herein, with reference to the accompanying drawings.

DETAILED DESCRIPTION

Figure 1:
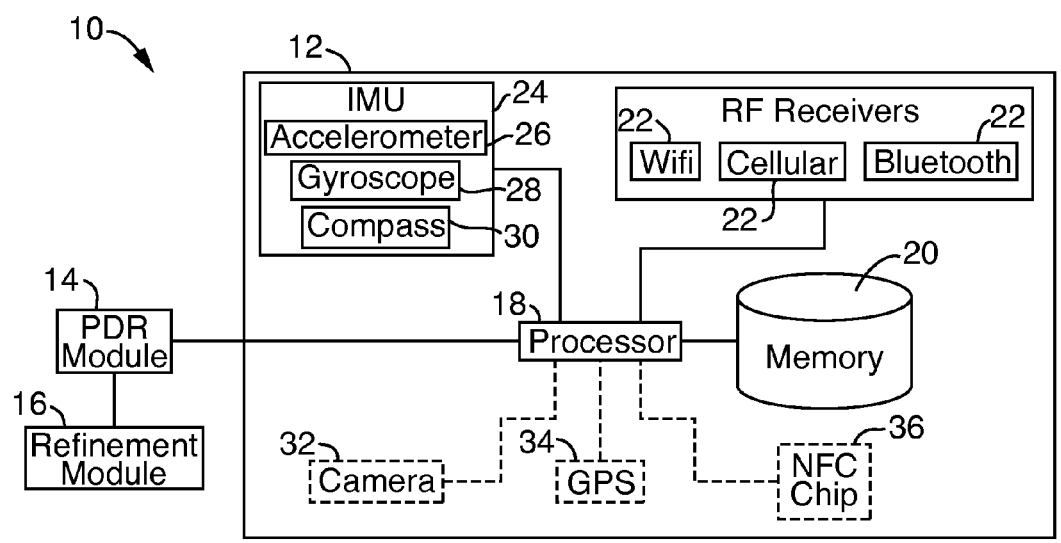
FIG. 1 is a schematic diagram of a system according to an embodiment.

Before the various embodiments are described in further detail, it is to be understood that the invention is not limited to the particular embodiments described. It will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

In the drawings, like reference numerals refer to like features of the systems and methods of the present application. Accordingly, although certain descriptions may refer only to certain Figures and reference numerals, it should be understood that such descriptions might be equally applicable to like reference numerals in other Figures.

Referring to FIG. 1, a system 10 for indoor position tagging of user equipment 12 includes a pedestrian dead reckoning (PDR) module 14 and a refinement module 16. The user equipment 12 may include, for example, known mobile electronic devices such as smartphones, tablets or the like that include at least one processor 18, memory 20, one or more radio frequency (RF) receivers 22 and an inertial measurement unit (IMU) 24 operatively connected to the at least one processor 18. The IMU 24 may include all of the sensors available on a modern smartphone or tablet including a three-axis accelerometer 26, three-axis gyroscope 28 and three-axis compass 30, thereby allowing the IMU 24 to track three-dimensional orientation at high frequency. The one or more RF receivers 22 may detect multiple modalities of RF transmissions including WiFi, 3G, 4G Long Term Evolution (LTE), Bluetooth transmissions or any similar RF transmissions. The user equipment 12 may also include one or more of a camera 32 for scanning barcodes, global positioning system (GPS) 34 and/or near field communication (NFC) chip 36 for determining absolute position data, as will be discussed in greater detail below. Absolute position data may also be provided by short-range (e.g. 2m) Bluetooth beacons and/or WiFi access points having known coordinates and relatively weak or shielded signals requiring the user equipment 12 to be close in order to register the signals transmitted therefrom. These Bluetooth beacons and WiFi access points may advantageously alleviate any need for taking the user equipment 12 out of the pocket. The memory 20 may store, among other things, time stamped measurements taken by the various sensors of the IMU 24, values detected by the one or more RF receivers 22 and absolute position data input through the camera 32 scanning a barcode, the GPS 34 and/or the NFC chip 36.

The system 10 includes the necessary electronics, software, memory, storage, databases, firmware, logic/state machines, microprocessors, communication links, and any other input/output interfaces to perform the functions described herein and/or to achieve the results described herein. For example, the system 10 may include one or more processors and memory, such as the processor 18 and memory 20 of the user equipment 12, which may include system memory, including random access memory (RAM) and read-only memory (ROM). Suitable computer program code may be provided to the system 10 for executing numerous functions, including those discussed in connection with the PDR module 14 and the refinement module 16.

For example, in embodiments, both the PDR module 14 and the refinement module 16 may be stored in memory 20 on the user equipment 12 and may be executed by the processor 18 of the user equipment. In embodiments, the PDR module 14 may be stored in memory 20 on the user equipment 12 and may be executed by the processor 18, while the refinement module 16 may be stored on and executed by a remote computing device, such as a server in communication with the user equipment 12 over a network, as should be understood by those skilled in the art. In embodiments, both the PDR module 14 and the refinement module 16 may be stored on and executed by one or more remote computing devices in communication with the user equipment 12, as should be understood by those skilled in the art.

The one or more processors may include one or more conventional microprocessors and one or more supplementary co-processors such as math co-processors or the like. The one or more processors may communicate with other networks and/or devices such as servers, other processors, computers, cellular telephones, tablets and the like.

The one or more processors may be in communication with the memory, which may comprise an appropriate combination of magnetic, optical and/or semiconductor memory, and may include, for example, RAM, ROM, flash drive, an optical disc such as a compact disc and/or a hard disk or drive. The one or more processors and the memory each may be, for example, located entirely within a single computer or other device, such as the user equipment 12; or connected to each other by a communication medium, such as a USB port, serial port cable, a coaxial cable, an Ethernet type cable, a telephone line, a radio frequency transceiver or other similar wireless or wired medium or combination of the foregoing.

The memory, such as memory 20 of the user equipment 12, may store inertial measurements taken by the IMU 24, RF signal measurements from the plurality of RF receivers 22 and/or absolute position data input through the camera 32 scanning a barcode, the GPS 34 and/or the NFC chip 36. The memory may also store any other information required by the system 10, including an operating system for the system 10, and/or one or more other programs (e.g., computer program code and/or a computer program product) adapted to direct the system 10 to perform according to the various embodiments discussed herein. For example, the memory may also store graphical images for outputting mapped data as discussed herein. The PDR module 14 and refinement module 16 and/or other programs may be stored, for example, in a compressed, an uncompiled and/or an encrypted format, and may include computer program code executable by the one or more processors. The instructions of the computer program code may be read into a main memory of the one or more processors, such as the processor 18, from the memory 20 of the user equipment 12 or a computer-readable medium other than the memory 20. While execution of sequences of instructions in the program causes the one or more processors to perform the process steps described herein, hard-wired circuitry may be used in place of, or in combination with, software instructions for implementation of the processes of the present invention. Thus, embodiments of the present invention are not limited to any specific combination of hardware and software.

The methods and programs discussed herein may also be implemented in programmable hardware devices such as field programmable gate arrays, programmable array logic, programmable logic devices or the like. Programs may also be implemented in software for execution by various types of computer processors. A program of executable code may, for instance, comprise one or more physical or logical blocks of computer instructions, which may, for instance, be organized as an object, procedure, process or function. Nevertheless, the executables of an identified program need not be physically located together, but may comprise separate instructions stored in different locations which, when joined logically together, comprise the program and achieve the stated purpose for the programs such as providing indoor position tagging of user equipment 12. In an embodiment, an application of executable code may be a compilation of many instructions, and may even be distributed over several different code partitions or segments, among different programs, and across several devices.

The term "computer-readable medium" as used herein refers to any medium that provides or participates in providing instructions and/or data to the one or more processors of the system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the one or more processors, such as the processor 18 of the user equipment 12, (or any other processor of a device described herein) for execution. For example, the instructions may initially be stored on a magnetic disk of a remote computer (not shown). The remote computer can load the instructions into its dynamic memory and send the instructions over an Ethernet connection, cable line, telephone line using a modem, wirelessly or over another suitable connection. A communications device local to a computing device can receive the data on the respective communications line and place the data on a system bus for the one or more processors. The system bus carries the data to the main memory, from which the one or more processors retrieves and executes the instructions. The instructions received by main memory may optionally be stored in memory, such as memory 20 of the user equipment 12, either before or after execution by the one or more processors. In addition, instructions may be received via a communication port as electrical, electromagnetic or optical signals, which are exemplary forms of wireless communications or data streams that carry various types of information.

Figure 2:
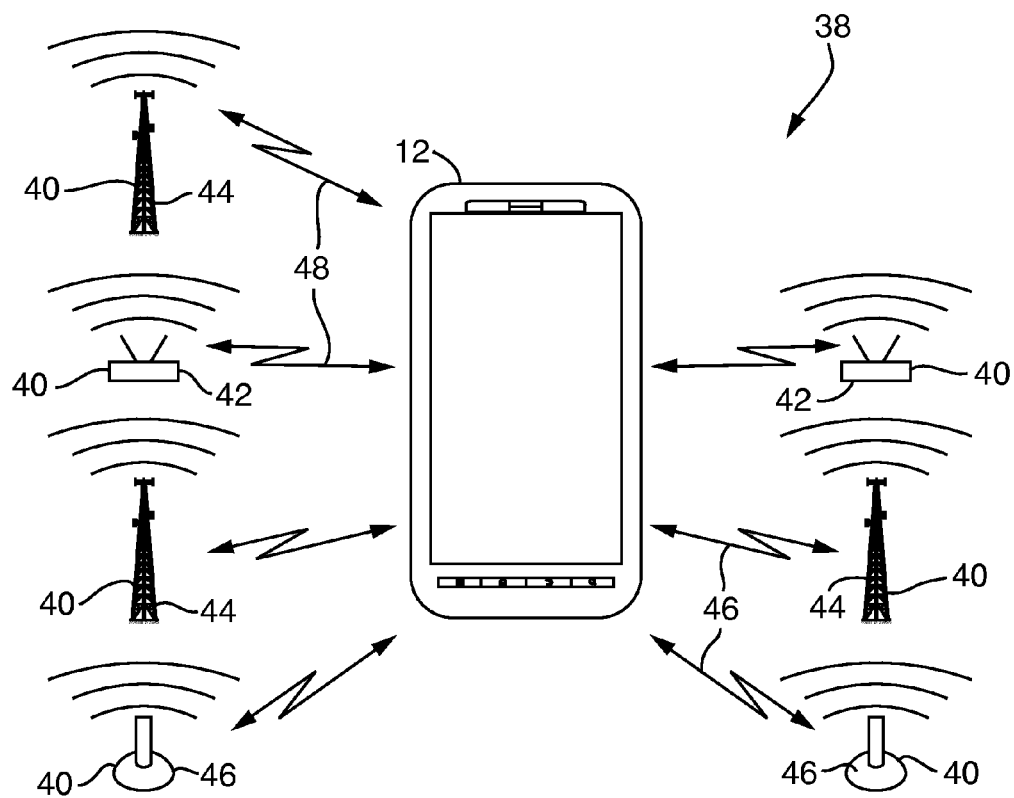
FIG. 2 is schematic diagram of an embodiment for providing position tagging in an environment with the system of FIG. 1.

Referring to FIG. 2, the system 10, shown in FIG. 1, may be implemented on user equipment 12 for indoor position tagging of user equipment 12 within an environment 38. The environment 38 may include a plurality of RF communication links 40 for enabling pervasive computing within the environment 38. The plurality of RF communication links 40 may include communication links of different modalities including WiFi access points 42, network small cells 44, Bluetooth links 46 or the like. The environment 38 may be, for example, an environment where localization through global positioning systems (GPS) is denied, deprived or otherwise, at least partially, unavailable due to poor signal quality or the like. For example, the environment 38 may be an indoor environment such as an office building, shopping mall, subway station, school, airport, residential building, campus or any other similar environment. The user equipment 12 may be any portable electronic device that may be worn and/or carried by a user inside the environment 38. The user equipment 12 may receive RF signals 48 from none, one or more of the RF communication links 40, depending upon a location of the user equipment 12 in the environment 38.

Figure 3:
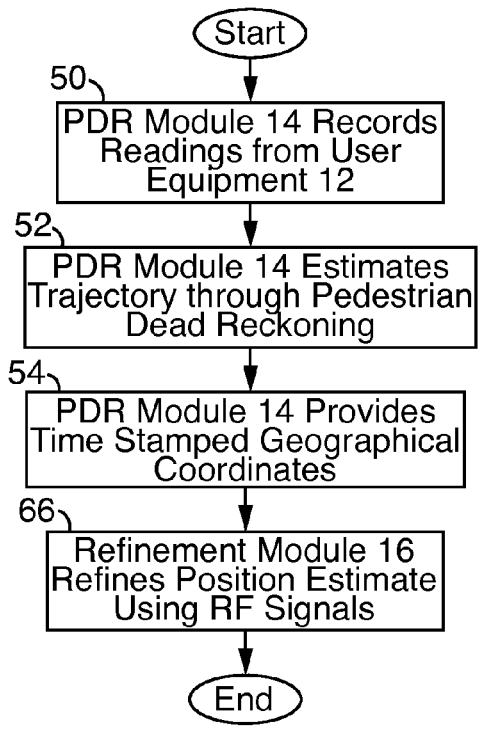
FIG. 3 is a flow diagram of an embodiment for providing position tagging with the system of FIG. 1.

Referring to FIG. 3, in operation, as the user walks through the environment 38, shown in FIG. 2, with the user equipment 12, at step 50, the PDR module 14 queries and records time-stamped readings from the various sensors and RF receivers 22, shown in FIG. 1, of the user equipment 12. For example, the PDR module 14 may record inertial readings from the accelerometer 26, gyroscope 28 and compass 30 and readings of absolute position data input through the camera 32 scanning a barcode, such as a QR code, the GPS 34, where available, such as when entering a building, when indoors near a large window or when indoors on an upper floor of the building, and/or the NFC chip 36 scanning an NFC tag. The PDR module may also record readings from the RF receivers 22 such as WiFi signal strength and WiFi positioning, as detected from the WiFi access points 42, Bluetooth Received Signal Strength from each Bluetooth link 46, and Reference Signal Received Power and Reference Signal Received Quality from the network small cells 44. For example, in an embodiment, the user may collect the time-stamped readings from the user equipment 12 while walking freely through the environment 38, shown in FIG. 2, such as an office building. As the user walks the PDR module 14 collects the various sensor data discussed above and records absolute position data when the user scans NFC tags and/or bar codes at specific landmarks or when the user equipment registers GPS data For example, the PDR module 14 may record absolute position data from the GPS when indoors when the GPS signal exceeds a certain threshold, such as when signals are detected from at least four satellites. The system 10 advantageously allows for data acquisition by the PDR module 14 at step 50 to occur with the user equipment 12 remaining in the user's pocket or otherwise put away, at least a majority of the time.

At step 52, the PDR module 14 uses the recorded readings from the various sensors of the user equipment 12 to perform pedestrian dead reckoning to incrementally estimate a trajectory of the user equipment 12 and, thus, the user carrying the user equipment 12. To perform pedestrian dead reckoning, the PDR module 14 first detects and counts steps taken by the user through the inertial measurements of the IMU 24, shown in FIG. 1. Specifically, the IMU 24, shown in FIG. 1, tracks three-dimensional orientation (yaw, pitch and roll angles) at high frequency through the accelerometer 26, gyroscope 28 and compass 30, all shown in FIG. 1. For example, the system 10 may be implemented on a smart phone running the Android Operating System and may sample accelerometer and gyroscope measurements at 50 Hz. Step detection may be performed by detecting peaks in a vertical component of acceleration (e.g., every time that the user's foot hits the floor) as measured by the IMU 24, shown in FIG. 1. To detect the peaks, the PDR module 14 may first use the three-dimensional orientation (yaw, pitch and roll angles) to rotate the raw accelerometer readings from the IMU 24, shown in FIG. 1, which are in a coordinate system of the user equipment 12, to accelerometer readings in a local ground coordinate system defined by longitude, latitude and upright axes. The PDR module 14 may then extract the vertical component of acceleration from the inertial measurements by detecting peaks in the rotated vertical component of acceleration. For example, the PDR module 14 may detect peaks by median-filtering the vertical component of acceleration to remove noise and then computing a sliding-window variance on a window of the filtered acceleration, which is thresholded to reveal the peaks. The PDR module 14 may, for example, detect a step or stride corresponding to two consecutive peaks of the variance of acceleration within a specified time window, such as a time window between 0.5 seconds and 1.5 seconds.

Once the PDR module 14 determines that the user has taken a step, the PDR module 14 performs pedestrian dead reckoning using the readings from the various sensors of the user equipment 12 to provide geographical coordinates at step 54, expressed as (floor, latitude, longitude), for respective (e.g., each) step taken by the user, along with a time stamp for each coordinate. For example, the pedestrian dead reckoning of the PDR module 14 may be performed according to the systems and methods described in U.S. patent application Ser. No. 14/063,735, filed on Oct. 25, 2013, which is hereby incorporated herein by reference in its entirety. Additionally, the PDR module 14 may provide floor recognition in accordance with the localization activity classification systems and methods described in U.S. patent application Ser. No. 14/152,209, filed on Jan. 10, 2014, which is also hereby incorporated herein by reference in its entirety.

In an embodiment, the PDR module 14 estimates the position of the user equipment 12 after the step relative to the position of the user equipment 12 prior to the step using motion model equations:

$$x_{1,t+1} = x_{1,t} + d_t \cos(\theta_t + \xi + \beta_t) \quad (1)$$

$$x_{2,t+1} = x_{2,t} + d_t \sin(\theta_t + \xi + \beta_t) \quad (2)$$

$$\theta_{t+1} = \theta_t + \phi_t \quad (3)$$

where:
$x_{1,t+1}$ is the X coordinate after the step;
$x_{2,t+1}$ is the Y coordinate after the step;
$\theta_{t+1}$ is a yaw after the step;
$x_{1,t}$ is the X coordinate prior to the step;
$x_{2,t}$ is the Y coordinate prior to the step;
$\theta_t$ is a yaw prior to the step;
$\beta_t$ is a pocket offset angle;
$\phi_t$ is a yaw increment during the step;

$\xi$ is an offset angle between an arbitrary map coordinate system and the local ground coordinate system; and
$d_t$ is a length of the stride.

The PDR module 14 estimates a heading of the user and user equipment 12 as a combination of the yaw value $\theta_t$ and the pocket offset angle $\beta_t$ by using the three-dimensional orientation of the user equipment 12 as measured by the IMU 24, shown in FIG. 1, at every step. The PDR module 14 may first estimate the orientation of the user equipment 12 relative to the longitude axis in the ground coordinate system using the yaw measurement from the IMU 24, shown in FIG. 1, which is the angle between the longitude axis in the ground coordinate system and the projection of the X-axis of the coordinate system of the user equipment 12 onto the ground plane. For example, the PDR module 14 may median filter the yaw measurements over a number of time points (e.g. five) and average the filtered measurements within the time interval corresponding to one stride to estimate the yaw increment during the step $\phi_t$ and, thus, the yaw value $\theta_t$. Using the yaw value $\theta_t$, the PDR module 14 may estimate the heading by incrementing the yaw value $\theta_t$ by a pocket offset angle $\beta_t$, which accounts for an orientation of the user equipment 12 in the user's pocket in relation to the heading, i.e. the direction of movement. The heading estimate of the PDR module 14 assumes that the walking motion is always forward and that the user equipment 12 is immobile in the user's pocket. Thus, despite potential shifts of the user equipment 12 in the user's pocket, $\beta_t$ may be fixed to a constant value, thereby simplifying calculations using the motion model equations (1), (2) and (3).

The length of the stride $d_t$ corresponds to the distance between two steps taken by the user and detected by the user equipment 12. Although the length of the stride $d_t$ may be calculated at each step, in embodiments, the length of the stride $d_t$ may instead be held constant between two known positions, thereby simplifying calculations using the motion model equations (1), (2) and (3).

The offset angle $\tau$ is the transform angle between the arbitrary map coordinate system (e.g. the map coordinate system of a building, campus or the like) and the local ground coordinate system defined by the longitude (towards East) and latitude (towards North) axes. In using the offset angle $\xi$, the PDR module 14 ignores curvature of the earth at the scale of the environment 38 (e.g. the building), shown in FIG. 2, which is at most a few hundred meters, and considers the local ground coordinate system as orthogonal within that radius, thereby enabling affine transforms between the coordinate systems.

The pedestrian dead reckoning provided by the PDR module 14 through the motion model equations (1), (2) and (3) may experience long term drift, particularly where the pocket offset angle $\beta_t$ and the length of the stride $d_t$ have been set as constants between known positions. Therefore, during the walking trajectory, the PDR module 14 may frequently reset the position of the user equipment 12 in pedestrian dead reckoning using absolute position data from a collection of landmarks that encode their own position, such as GPS readings, NFC tags or bar codes. For example, GPS position fixes detected by the GPS 34, shown in FIG. 1, providing absolute position data may be available when the user is outdoors with the user equipment 12, such as in environments that include both indoor and outdoor areas, at the entrance and/or exit to a building environment, indoors when near a large window or near an upper floor of a building or the like. When indoors, GPS position fixes may only be used for providing absolute position data when the signal exceeds a certain threshold, such as when signals are detected from at least four satellites. Self-describing visual bar codes (e.g. two-dimensional QR codes) that encode their own position may provide coordinates that can be read by the PDR module 14 using the camera 32. Similarly, self-describing NFC tags may be programmed with their position so that the coordinates may be read by the PDR module 14 through the NFC chip 36, shown in FIG. 1. Additionally, the PDR module 14 may also exploit organic activity landmarks, such as stairs or elevators, by activity classification based on accelerometer readings as discussed in U.S. patent application Ser. No. 14/152,209, filed on Jan. 10, 2014. The PDR module 14 may also use a list of short-range (e.g. 2m) Bluetooth beacons and/or WiFi access points having known coordinates and relatively weak or shielded signals to provide absolute positioning data for the user equipment 12 by requiring the user equipment 12 to be close in proximity in order to register the signals transmitted therefrom. For example, the PDR module 14 may exploit a list of known Bluetooth emitters having known geographical positions and MAC addresses, along with the Bluetooth receiver 22 embedded on the user equipment 12, by matching the MAC address of the received Bluetooth signal to the list of MAC addresses in the list of known Bluetooth emitters. Similarly, the landmarks may also include WiFi tags that can be detected by the WiFi receiver of the use equipment 12. The position of these organic activity landmarks may be matched on a map or the like. To reset the position, the PDR module 14 may assign the floor and position $(x_{1,t}; x_{2,t})$ of the user equipment 12 the a known floor and coordinates $(y_{1,k}; y_{2,k})$ of the k-th landmark.

Figure 4:
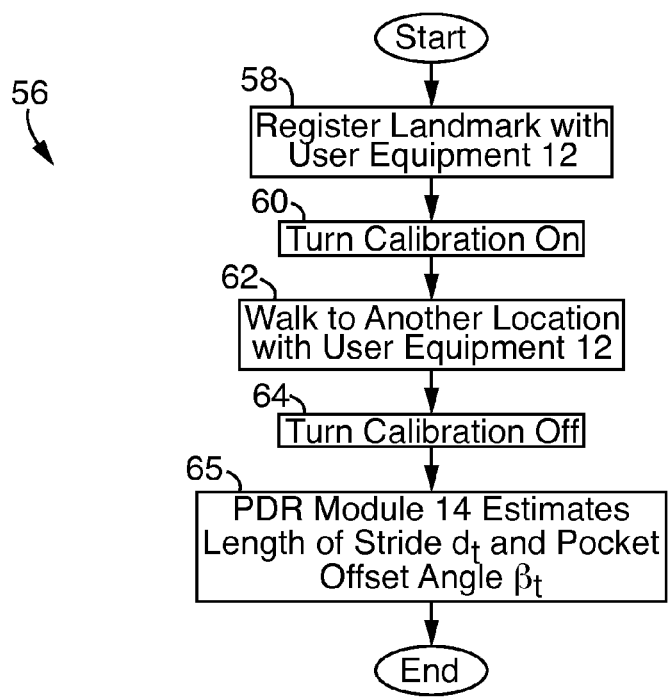
FIG. 4 is a flow diagram of an embodiment of a calibration procedure for the system of FIG. 1.

As discussed above, both the length of the stride $d_t$ and the pocket offset angle $\beta_t$ may set to constant values in the PDR module 14. For example, referring to FIG. 4, in an embodiment, the PDR module 14 may execute a calibration procedure 56 prior to providing pedestrian dead reckoning for a user to set the values for length of the stride $d_t$ and the pocket offset angle $\beta_t$. To calibrate the PDR module 14, the user may first place the user equipment 12 at a landmark at step 58 to provide the PDR module 14 with a known initial location for the user equipment 12. The initial landmark at an initial location may be provided, for example, by GPS coordinates, or by reading an NFC tag or a bar code, as discussed above. At step 60, the user may then turn calibration on, for example, through a graphical user interface displayed on the user equipment 12, as should be understood by those skilled in the art. At step 62, the user may then place the user equipment 12 in a desired orientation and may walk freely from the initial landmark to another location. Once at the other location, at step 64, the user turns calibration off, for example, through the graphical user interface displayed on the user equipment 12. During this calibration procedure, the PDR module 14 reads the various sensors of the user equipment 12, as discussed above, and uses these readings to estimate and set constant values for both the length of the stride $d_t$ and the pocket offset angle $\beta_t$ at step 65. For example, in an exemplary embodiment, the length of the stride $d_t$ may be set to an approximate value between 1.2 and 2 meters. Once the PDR module 14 has been calibrated to set the length of the stride $d_t$ and the pocket offset angle $\beta_t$, the user may then use the activate the PDR module 14 to begin pedestrian dead reckoning, as discussed above, for example, through the graphical user interface displayed on the user equipment 12 or the like. In embodiments, the length of the stride $d_t$ and the pocket offset angle $\beta_t$ may be recalibrated for the PDR module 14 each time the PDR module 14 is used to perform pedestrian dead reckoning. In other embodiments, since the length of the stride $d_t$ for a particular user should remain substantially the same, the length of the stride $d_t$ and the pocket offset angle $\beta_t$ may only be calibrated for the first time a particular user carries the user equipment 12, in which case the user may be required to put the user equipment 12 in the same location (e.g. pocket) in the same orientation every time pedestrian dead reckoning is performed by the PDR module 14.

Referring back to FIG. 3, after the PDR module 14 performs pedestrian dead reckoning at step 52, the PDR module 14 provides geographical coordinates at step 54 to the refinement module 16, expressed as (floor, latitude, longitude), for each step taken by the user, along with a time stamp for each coordinate. The PDR module may also provide the refinement module 16 with one or more of the time stamped record readings from the RF receivers 22, shown in FIG. 1, including WiFi signal strength and WiFi positioning, as detected from the WiFi access points 42, shown in FIG. 2, Bluetooth Received Signal Strength from each Bluetooth link 46, shown in FIG. 2, and/or Reference Signal Received Power and Reference Signal Received Quality from the network small cells 44, shown in FIG. 2. The refinement module 16 uses the geographical coordinates to refine the estimate of position using RF signal similarities at step 66. For example, the refinement module 16 may implement the simultaneous localization and mapping systems and methods described in U.S. patent application Ser. No. 14/063,735, filed on Oct. 25, 2013, which is hereby incorporated herein by reference in its entirety, to refine the estimate of position provided by the PDR module 14. This refinement may also implement the localization activity classification systems and methods described in U.S. patent application Ser. No. 14/152,209, filed on Jan. 10, 2014, which is also hereby incorporated herein by reference in its entirety. The refinement by the refinement module 16 may be directly applied to close gaps and loops in the pedestrian dead reckoning coordinates (which may be discontinuous because of the repeated position resets at absolute landmarks encountered on the trajectory) to provide a refined trajectory of the user equipment 12 that is a smooth curve passing through all known landmarks encountered by the user. The refinement module 16, thus, provides refined position data for the user equipment 12 in the form of coordinates (e.g. latitude, longitude) and floor identification that represent the trajectory of the user equipment 12 within the environment 38, shown in FIG. 2.

Since the refined user equipment 12 position data is labeled with a set of coordinates (e.g. latitude, longitude) and floor identification, the position data may be overlaid on building blueprints inserted into a map by the system 10, shown in FIG. 1, to construct heat maps, coverage maps and other similar maps for a variety of network performance data. The system 10, shown in FIG. 1, and the maps and mapped performance data generated therefrom may advantageously be used by network installation, optimization and/or repair teams to eliminate much of the manual work typically required for provide network services.

Figure 5:
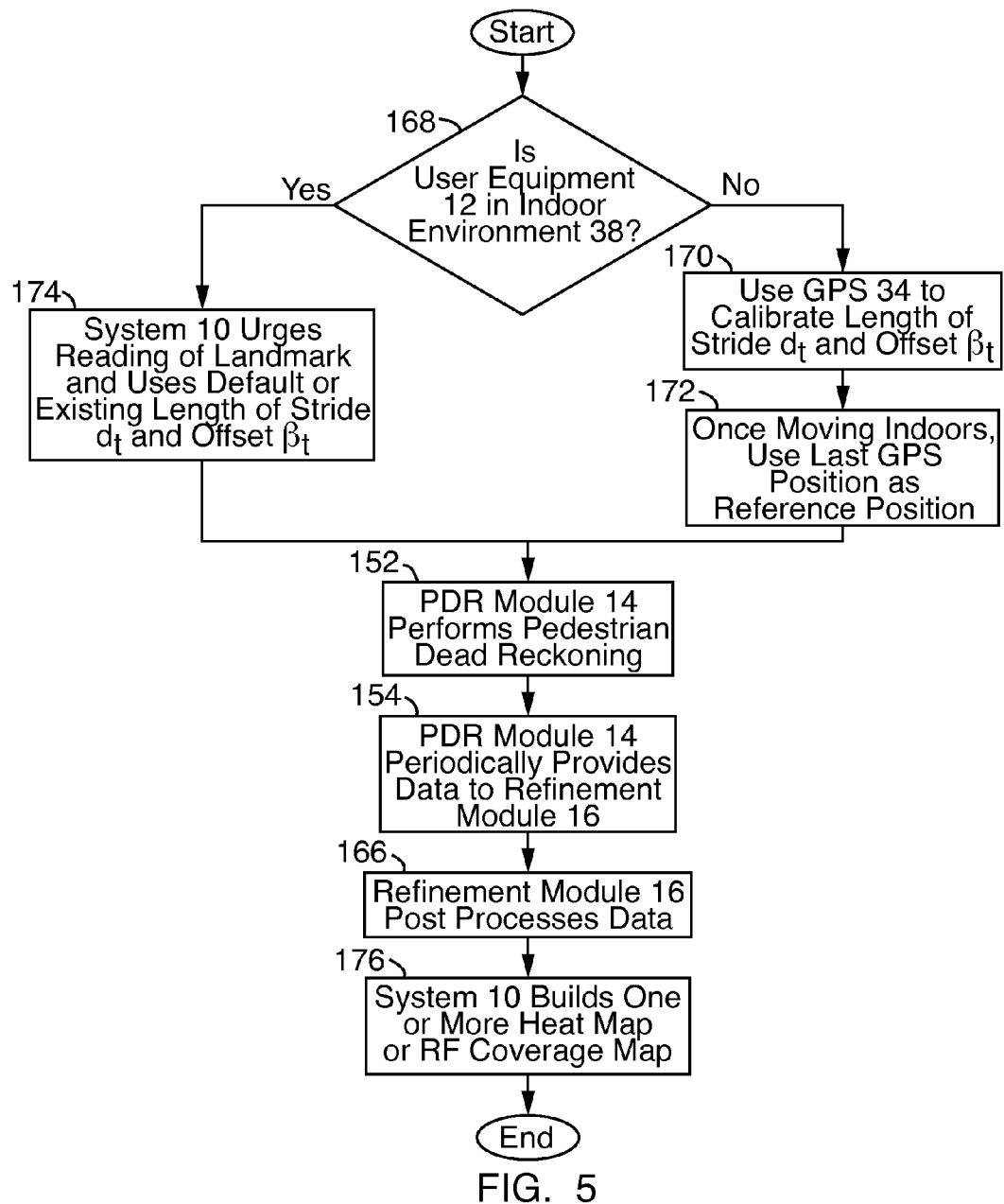
FIG. 5 is a flow diagram of an embodiment for providing position tagging with the system of FIG. 1.

For example, referring to FIG. 5, wherein like numerals represent like elements, the system 10 may use crowd sourced data from a plurality of users carrying user equipment 12 to built data heat maps and/or RF coverage maps. These data heat maps and RF coverage maps are critical for efficient placement of indoor network small cells 44, that is, where to place the indoor small cells 44 within the environment 38. The building of these maps require continuous collection of positions of all indoor user equipment 12 together with data through put and signal strength measurements from the indoor network small cells 44 as provided by one or more of the RF receivers 22, shown in FIG. 1. To build the data heat maps and/or RF coverage maps, for each piece of user equipment 12, the system 10 may initially determine if the user equipment 12 is in the indoor environment 38 at step 168. This may be done, for example, by querying the GPS 34 to determine if GPS positioning is available or by the user entering a status through the graphical user interface displayed on the user equipment 12. If the user equipment 12 is not in an indoor environment, the system 10 may use the GPS 34 to calibrate or recalibrate the length of the stride $d_t$ and the pocket offset angle $\beta_t$ at step 170 and may set a landmark using the last known position provided by the GPS 34 at step 172 when the user enters the indoor environment 38.

Alternatively, if the system 10 determines that the user equipment 12 is in the indoor environment 38 at step 168, at step 174, the system 10 may prompt the user to read absolute position data through a landmark such as an NFC tag, a barcode, a Bluetooth beacon, a WiFi access point, a WiFi tag, an organic landmark or the like using the user equipment 12, as discussed above. For example, the system 10 may cause the user equipment 12 to emit a periodic beep or the like until a landmark is scanned. Additionally, the system 10 may set the length of the stride $d_t$ and the pocket offset angle $\beta_t$ to the default or existing values input into the system 10 through the calibration procedure discussed above.

Once the initial position data is entered into the system 10, the PDR module 14 performs pedestrian dead reckoning at step 152, as discussed above. The PDR module 14 may then periodically provide the time stamped geographical coordinates and other relevant data, such as the readings from the RF receivers 22, to the refinement module 16 at step 154, as discussed above. For example, in an embodiment, the PDR module 14 may reside on and be executed by the user equipment 12, while the refinement module 16 may reside, for example, on a server that is remote from the user equipment 12. The relevant data or information collected by the system 10, including a specified set of RF data and positional data, may be transported by 3GPP Minimization of Drive Test protocols as should be understood by those skilled in the art. At step 166, the refinement module 16 may post-process the data provided by the PDR module 14, as discussed above, to smooth the trajectory of the user equipment 12 and to remove erroneous position points.

At step 176, the system 10 may then build one or more data heat maps and/or RF coverage maps for the environment 38 using the refined position data piece of user equipment 12 within the environment 38, which is expressed as a set of time stamped coordinates (e.g. latitude, longitude), by correlating the time stamped coordinates to one or more of the recorded time stamped readings from the RF receivers 22, shown in FIG. 1, including WiFi signal strength as detected from the WiFi access points 42, shown in FIG. 2, Bluetooth Received Signal Strength from each Bluetooth link 46, shown in FIG. 2, and/or Reference Signal Received Power and Reference Signal Received Quality from the network small cells 44, shown in FIG. 2. The system 10 builds the one or more data heat maps for the environment 38 using crowd sourced data from a multiple number of user equipment 12 to provide global map coverage showing hot spots or major areas within the environment 38 where the users are using data. Thus, the system 10 may provide geographic user behavior within the particular environment 38, such as to identify high traffic pedestrian areas and the like. The system 10 may also build the one or more RF coverage maps for the environment 38 using the crowd sourced data from the multiple number of user equipment 12 to provide global map coverage showing RF signatures within the environment.

The data heat maps and RF coverage maps provided by the system 10 may advantageously be employed for deployment of network small cells 44 in telecommunication networks with the environment 38. For example, the data heat maps may show areas where significant data activity occurs and, therefore, increased coverage may be desirable. The RF coverage maps my show areas within the environment 38 where network coverage is weak or lacking altogether, such that coverage in those areas may be improved through further network small cell deployment in those areas and/or adjustment of the orientation of existing antennas. The system 10, thus, provides position tagging of user equipment 12 in indoor environments 38 where existing methods for position tagging are either typically not available indoors, such as GPS, or too cumbersome in computation, such as RF fingerprinting.

Figure 6:
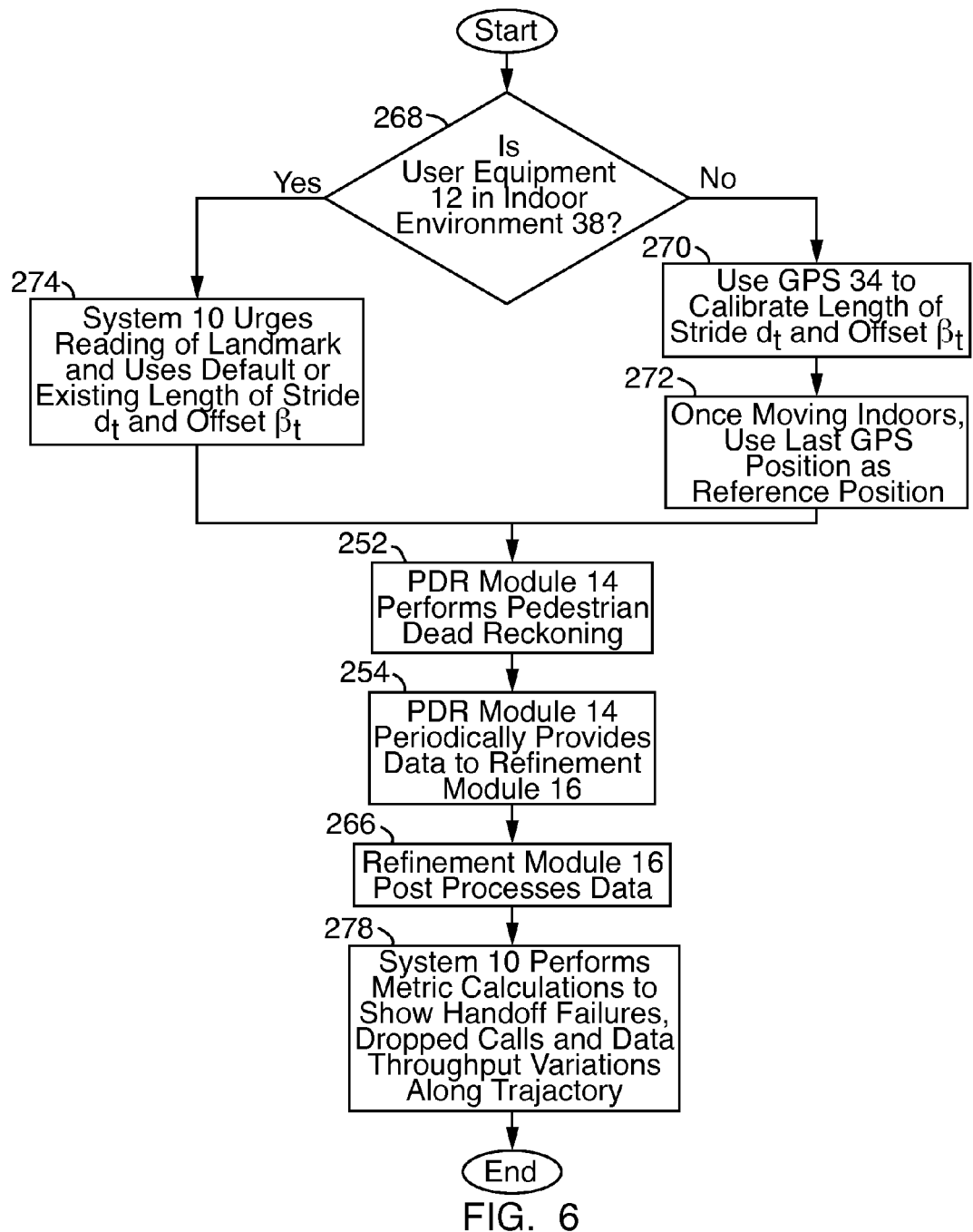
FIG. 6 is a flow diagram of an embodiment for providing position tagging with the system of FIG. 1.

Referring to FIG. 6, the system 10 may also plot performance metrics for user equipment 12 for network performance optimization by targeting network performance for local users within the environment 38 after indoor network deployment. The system 10 may extend the map building into performance optimization by analyzing interactions among the small cells 44 within the environment 38 and by analyzing interactions between the indoor small cells 44 and outdoor macro cells. For example, the system 10 may initially determine if the user equipment 12 is in the indoor environment 38 at step 268, in substantially the same manner discussed above. If the user equipment 12 is not in the indoor environment, the system 10 may use the GPS 34 to calibrate or recalibrate the length of the stride $d_t$ and the pocket offset angle $\beta_t$ at step 270 and may set a landmark using the last known position provided by the GPS 34 at step 272 when the user enters the indoor environment 38 in substantially the same manner discussed above. If the system 10 determines that the user equipment 12 is in the indoor environment 38 at step 268, at step 274, the system 10 may prompt the user to read absolute position data through a landmark such as an NFC tag, a barcode, a Bluetooth beacon, a WiFi access point, a WiFi tag, an organic landmark or the like, as discussed above. Additionally, the system 10 may set the length of the stride $d_t$ and the pocket offset angle $\beta_t$ to the default or existing values input into the system 10 through the calibration procedure discussed above.

Once the initial position data is entered into the system 10, the PDR module 14 performs pedestrian dead reckoning at step 252 and periodically provides the time stamped geographical coordinates and other relevant data to the refinement module 16 at step 254, as discussed above. For example, as discussed above, the relevant data or information collected by the system 10, including a specified set of RF data and positional data, may be transported by 3GPP Minimization of Drive Test protocols as should be understood by those skilled in the art. At step 266, the refinement module 16 may post-process the data provided by the PDR module 14, as discussed above, to reconstruct the route of the user equipment 12.

At step 278, the system 10 may then perform network metric calculations using the recorded time stamped readings from the RF receivers 22, shown in FIG. 1, including WiFi signal strength as detected from the WiFi access points 42, shown in FIG. 2, Bluetooth Received Signal Strength from each Bluetooth link 46, shown in FIG. 2, and/or Reference Signal Received Power and Reference Signal Received Quality from the network small cells 44, shown in FIG. 2, and/or outdoor macro cells to show handoff failures, dropped calls, data throughput variations and the like along the route of the user equipment 12 within the environment 38 by correlating the time-stamped performance metrics to the refined position data. In an embodiment, multiple users may advantageously move through the environment 38 with user equipment 12 following one or more test routes and wireless configuration data relating to each piece of user equipment 12 and each data point may be collected and plotted by the system 10. These performance metrics may be used to determine if network small cells 44 (and base stations) are operating properly and, if not, to optimize network deployment, particularly within the environment 38 to, for example, by moving small cells 44 to reduce handoff failures, dropped calls and/or data throughput variations where present.

Advantageously, in an embodiment, the system 10 may be implemented with a multiple number of user equipment 12 within the environment 38 to provide indoor position coordinates for each of the multiple number of user equipment 12. Thus, the system 10 may advantageously gather crowd sourced geographic location data from each of a plurality of users carrying a respective user equipment 12 to improve network deployment and to gather geographic user behavior. Additionally, the positioning data provided by the system 10 may also advantageously be employed as a substitute for GPS 34 to provide position tagging of the user equipment 12 within the indoor environment where GPS positioning is not available. Additionally, the system 10 advantageously provides position tagging of user equipment 12 while allowing the user equipment 12 to remain in the user's pocket, with limited or no manual intervention.

As discussed above, the system 10 advantageously enables position tagging of user equipment 12, which may be employed for optimizing placement of network small cells in a given indoor environment and for analyzing the network small cell performance, including but not limited to appropriate orientation of antennas, RF coverage holes, degradation of user data throughput, handover failures and the like. The system 10 may advantageously be used to provide Minimization of Drive Test in indoor environments where Minimization of Drive Test standards using GPS are typically not available to fill in holes in the Minimization of Drive Test standards using GPS.

Although this invention has been shown and described with respect to the detailed embodiments thereof, it will be understood by those skilled in the art that various changes in form and detail thereof may be made without departing from the spirit and the scope of the invention. For example, although the system 10 is described primarily in connection with providing position tagging for a single piece of user equipment 12 in indoor environments, the system 10 may provide position tagging of a multiple number of user equipment 12 in a variety of environments, including outdoor environments or environments that include a combination of indoor and outdoor areas and may be used for the placement and optimization of network outdoor macro cells in addition to network small cells, as should be understood by those skilled in the art.

What is claimed is:

1. A system for providing position tagging within an environment, the system comprising:
    at least one mobile electronic device adapted to be moved within the environment, the at least one mobile electronic device including an inertial measurement unit, a radio frequency receiver, and at least one of a near field communication chip, barcode scanner, global positioning system, Bluetooth receiver or WiFi receiver;
    a pedestrian dead reckoning module adapted to query and record time stamped readings from the inertial measurement unit, the radio frequency receiver, and the at least one of the near field communication chip, barcode scanner, global positioning system, Bluetooth receiver or WiFi receiver;
    wherein the pedestrian dead reckoning module is adapted to:
        translate the recorded time stamped readings from the inertial measurement unit into geographic coordinates for respective steps taken by a user carrying the mobile electronic device;
        estimate a heading of the user within the environment using a combination of a yaw value and a pocket offset angle determined based on the recorded time stamped readings from the inertial measurement unit;
        record absolute position data input through the at least one of a near field communication chip, barcode scanner, global positioning system, Bluetooth receiver or WiFi receiver; and
        set, in the pedestrian dead reckoning module, a reference position for the at least one mobile electronic device to the recorded absolute position data; and
    a refinement module adapted to smooth a trajectory defined by the geographic coordinates using the at least one time stamped signal from the radio frequency receiver of the at least one mobile electronic device.

2. The system according to claim 1, wherein the refinement module is adapted to post-process the geographic coordinates using the at least one signal from the radio frequency receiver of the mobile electronic device.

3. The system according to claim 2, wherein the pedestrian dead reckoning module resides on the mobile electronic device and the refinement module resides on a server remote from the mobile electronic device.

4. The system according to claim 1, additionally comprising a graphical user interface adapted to be displayed on a screen of the mobile electronic device.

5. A computerized method comprising the steps of:
    recording, through a pedestrian dead reckoning module executed by a processor of a mobile device, time stamped readings from an inertial measurement unit of the mobile device, at least one time stamped signal from a radio frequency receiver of the mobile electronic device, and absolute position data input through at least one of a near field communication chip, barcode scanner, global positioning system, Bluetooth receiver, WiFi receiver or the radio frequency receiver of the mobile device;
    translating, through the pedestrian dead reckoning module executed by the processor of the mobile device, the recorded time stamped readings from the inertial measurement unit into geographic coordinates for respective steps taken by a user carrying the mobile device;
    estimating a heading of the user within an environment using a combination of a yaw value and a pocket offset angle determined based on the recorded time stamped readings from the inertial measurement unit;
    setting, in the pedestrian dead reckoning module, a reference position for the mobile device to the recorded absolute position data; and
    smoothing, by a refinement module on a server, a trajectory defined by the geographic coordinates using the at least one time stamped signal from the radio frequency receiver of the mobile electronic device.

6. The computerized method according to claim 5, additionally comprising the steps of calibrating, in the pedestrian dead reckoning module, a length of stride and a pocket offset angle for the mobile device.

7. The computerized method according to claim 5, additionally comprising the step of generating, by the refinement module on the server, a map of network coverage with the refined geographic coordinates.

8. The computerized method according to claim 7, wherein the map includes at least one of a data heat map or radio frequency coverage map.

9. The computerized method according to claim 7, wherein the map includes at least one performance metric showing at least one of handoff failures, dropped calls or data throughput variation along a trajectory defined by the geographic coordinates.

10. A non-transitory, tangible computer-readable medium storing instructions adapted to be executed by at least one processor to perform a method comprising the steps of:
recording, through a pedestrian dead reckoning module executed by a processor of a mobile device, time stamped readings from an inertial measurement unit of the mobile device, at least one time stamped signal from a radio frequency receiver of the mobile electronic device, and absolute position data input through at least one of a near field communication chip, barcode scanner, global positioning system, Bluetooth receiver, WiFi receiver or the radio frequency receiver of the mobile device;
translating, through the pedestrian dead reckoning module executed by the processor of the mobile device, the recorded time stamped readings from the inertial measurement unit into geographic coordinates for each step taken by a user carrying the mobile device;
estimating a heading of the user within an environment using a combination of a yaw value and a pocket offset angle determined based on the recorded time stamped readings from the inertial measurement unit;
setting, in the pedestrian dead reckoning module, a reference position for the mobile device to the recorded absolute position data; and
smoothing, by a refinement module on a server, a trajectory defined by the geographic coordinates using the at least one time stamped signal from the radio frequency receiver of the mobile electronic device.

11. The non-transitory, tangible computer-readable medium of claim 10, additionally storing instructions adapted to be executed by the at least one processor to perform the step of:
calibrating, in the pedestrian dead reckoning module, a length of stride and a pocket offset angle for the mobile device.

12. The non-transitory, tangible computer-readable medium of claim 10, additionally storing instructions adapted to be executed by the at least one processor to perform the step of:
generating, by the refinement module on the server, a map of network coverage with the refined geographic coordinates, the map including at least one of a data heat map, a radio frequency coverage map or at least one performance metric showing at least one of handoff failures, dropped calls or data throughput variation along a trajectory defined by the geographic coordinates.

* * * * *